United States Patent
Liu et al.

(10) Patent No.: US 9,703,662 B2
(45) Date of Patent: Jul. 11, 2017

(54) METHOD FOR CONTROLLING PLUG-IN BY A ROUTER AND THE ROUTER THEREOF

(71) Applicant: Xiaomi Inc., Beijing (CN)

(72) Inventors: Tiejun Liu, Beijing (CN); Zheng Li, Beijing (CN); Liang Cheng, Beijing (CN); Yuehua Jia, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 9 days.

(21) Appl. No.: 14/801,854

(22) Filed: Jul. 17, 2015

(65) Prior Publication Data

US 2016/0048439 A1 Feb. 18, 2016

Related U.S. Application Data

(63) Continuation of application No. PCT/CN2015/074623, filed on Mar. 19, 2015.

(30) Foreign Application Priority Data

Aug. 12, 2014 (CN) .......................... 2014 1 0394982

(51) Int. Cl.
*G06F 11/30* (2006.01)
*G06F 11/32* (2006.01)
*G06F 11/34* (2006.01)
*G06F 9/445* (2006.01)

(52) U.S. Cl.
CPC ...... *G06F 11/3051* (2013.01); *G06F 9/44505* (2013.01); *G06F 9/44526* (2013.01); *G06F 11/327* (2013.01); *G06F 11/3485* (2013.01)

(58) Field of Classification Search
None
See application file for complete search history.

(56) References Cited

U.S. PATENT DOCUMENTS

| | | | |
|---|---|---|---|
| 6,789,157 B1* | 9/2004 | Lilja | G06F 8/65 711/102 |
| 9,146,757 B1* | 9/2015 | Subramanian | G06F 9/44526 |
| 2013/0297965 A1* | 11/2013 | Mensah | H04L 41/0681 714/4.1 |

* cited by examiner

*Primary Examiner* — Henry Tsai
*Assistant Examiner* — Juanito Borromeo
(74) *Attorney, Agent, or Firm* — Jun He Law Offices P.C.; James J. Zhu

(57) ABSTRACT

The present disclosure relates to a method for controlling a plug-in by a router and the router thereof. The method includes: receiving a plug-in state request querying an operational state of a plug-in sent from a terminal device; obtaining the operational state of the plug-in according to the plug-in state request; and sending the operational state of the plug-in to the terminal device.

16 Claims, 13 Drawing Sheets

METHOD FOR CONTROLLING PLUG-IN BY A ROUTER AND THE ROUTER THEREOF

CROSS-REFERENCE TO RELATED APPLICATIONS

This application is a Continuation application of International Application No. PCT/CN2015/074623, filed with the State Intellectual Property Office of P. R. China on Mar. 19, 2015, which is based upon and claims priority to Chinese Patent Application No. 201410394982.7, filed on Aug. 12, 2014, the entire contents of which are incorporated herein by reference.

TECHNICAL FIELD

The present disclosure generally relates to the communication technology field, and more particularly, to a method for controlling a plug-in by a router and the router thereof.

BACKGROUND

With the development of communication technology, intelligent routers are being widely used. The intelligent router is no longer a traditional network equipment which only has a routing function. The intelligent router acts like a personal computer, which has its own operating system and hard disk that can store data, and is installed with various kinds of plug-ins, so as to provide a variety of services to users.

Developers may establish a plug-in platform on the intelligent router, such that a third party may develop plug-ins of its own to be installed and run on the router, thus realizing more application functions. However, in the related art, the users may only query which plug-ins are installed on the intelligent router, but may not know and manage the plug-ins on the intelligent router sufficiently.

SUMMARY

Accordingly, the present disclosure provides a method for controlling a plug-in by a router and the router thereof, which may solve the problem that a user may not know and manage plug-ins on the router sufficiently.

According to embodiments of a first aspect of the present disclosure, a method for controlling a plug-in by a router is provided. The method includes: receiving a plug-in state request querying an operational state of a plug-in sent from a terminal device; obtaining the operational state of the plug-in according to the plug-in state request; and sending the operational state of the plug-in to the terminal device.

According to embodiments of a second aspect of the present disclosure, a method for controlling a plug-in by a terminal device is provided. The method includes: sending a plug-in state request querying an operational state of a plug-in to a router according to an instruction from a user; receiving the operational state of a plug-in returned by the router according to the plug-in state request; and displaying the operational state of the plug-in to the user.

According to embodiments of a third aspect of the present disclosure, a router is provided. The router includes: a processor; a memory configured to store instructions executable by the processor; wherein the processor is configured to perform: receiving a plug-in state request querying an operational state of a plug-in sent from a terminal device; obtaining the operational state of the plug-in according to the plug-in state request; and sending the operational state of the plug-in to the terminal device.

According to embodiments of a fourth aspect of the present disclosure, a terminal device for controlling a plug-in is provided. The terminal device includes: a processor; a memory configured to store instructions executable by the processor; wherein the processor is configured to: send a plug-in state request querying an operational state of a plug-in to a router according to an instruction from a user; receive the operational state of a plug-in returned by the router according to the plug-in state request; and display the operational state of the plug-in to the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Exemplary embodiments will be described in detail herein, and examples thereof are illustrated in accompanying drawings. Throughout figures referred by the following description, the same reference number in different figures indicates the same or similar elements unless otherwise stated. Implementations described in the following exemplary embodiments do not represent all the implementations consistent with the present disclosure. Instead, they are only examples of the device and method consistent with some aspects of the present disclosure detailed in the appended claims.

Figure 1:
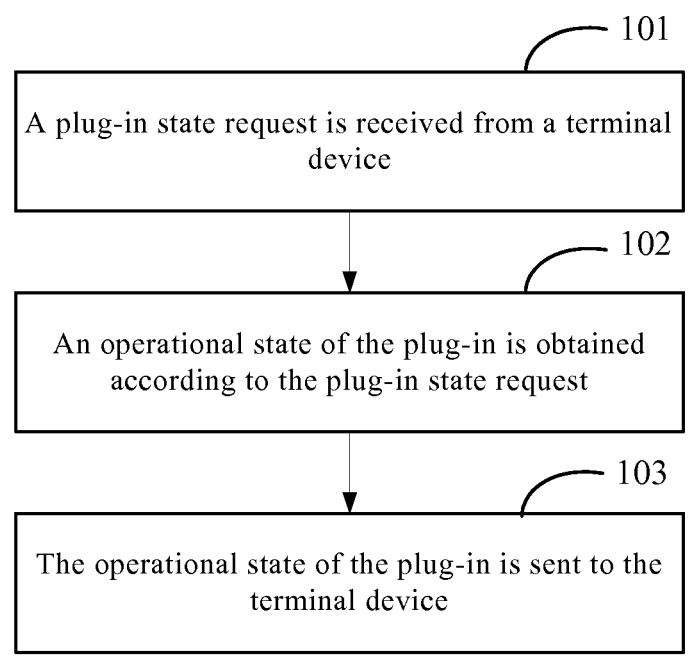
FIG. 1 is a flow chart of a method for controlling a plug-in according to an exemplary embodiment.

FIG. 1 is a flow chart of a method for controlling a plug-in according to an exemplary embodiment.

As shown in FIG. 1, the method for controlling the plug-in is applied in a router and includes the following steps.

In step 101, a plug-in state request querying an operational state of a plug-in is received from a terminal device.

In this embodiment, after being powered on to start, the router may receive the plug-in state request sent from the terminal device via a network, so as to obtain the operational state of the plug-in which a user wants to query according to the plug-in state request.

In step 102, the operational state of the plug-in is obtained according to the plug-in state request.

Based on step 101, after receiving the plug-in state request sent from the terminal device, the router obtains a plug-in ID from the plug-in state request, and obtains a process ID corresponding to the plug-in according to the plug-in ID, and then obtains the operational state of the plug-in according to the process ID.

In step 103, the operational state of the plug-in is sent to the terminal device, such that the terminal device can display the operational state of the plug-in to the user.

It can be seen that, in this embodiment, the router may obtain the operational state of the plug-in, which the user wants to query according to the plug-in state request, sent by the terminal device, and send the operational state of the plug-in to the terminal device, such that the user may query the actual operational state of the plug-in on the router.

Figure 2A:
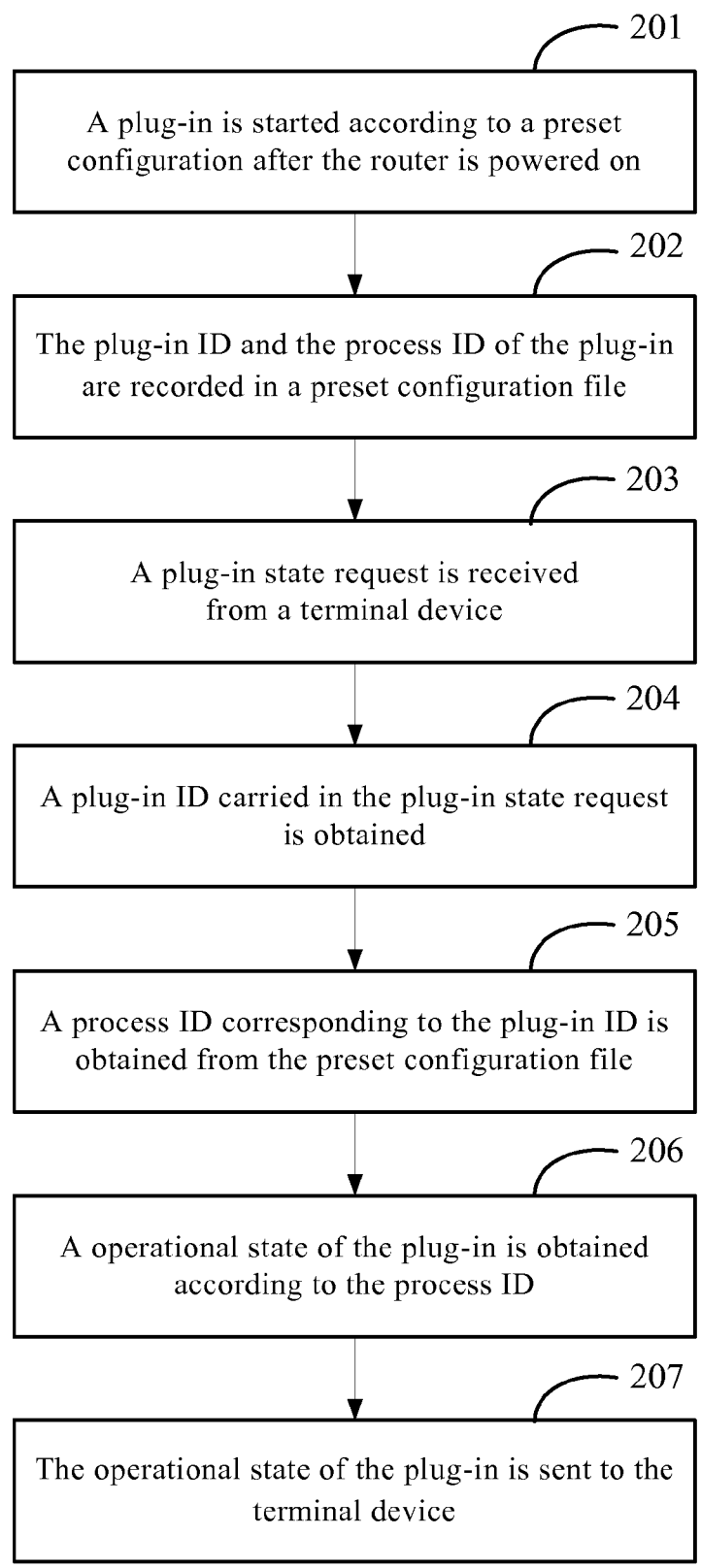
FIG. 2A is a flow chart of another method for controlling a plug-in according to an exemplary embodiment.

FIG. 2A is a flow chart of another method for controlling a plug-in according to an exemplary embodiment.

As shown in FIG. 2A, the method for controlling the router plug-in is applied in a router and includes following steps.

In step 201, a plug-in is started according to a preset configuration after the router is powered on.

The plug-in, for example, Thunder plug-in, is generally developed by a third-party developer, and can be installed on the router for running. The plug-in may be configured by the user according to his/her requirements, for example, whether the plug-in is started immediately after the router is powered on.

In this embodiment, after the router is powered on, the plug-in is started according to the configuration preset by the user. Starting the plug-in includes creating a new process, and allocating the new process to the plug-in to be started for use.

In step 202, a plug-in ID and a process ID of the plug-in are recorded in a preset configuration file.

Based on the above step 201, the plug-in ID and the process ID of the plug-in, which has already been started, are recorded in the preset configuration file. The plug-in ID may be a number which the router assigns to the plug-in after the plug-in is installed in the router. The plug-in ID is used for identifying a unique plug-in, such that it is possible to search for a corresponding plug-in according to the plug-in ID during communication between the router and the terminal device. The process ID is a numerical value used by the kernel of the operating system for identifying a process uniquely. The preset configuration file can be understood as a storage space preset in the router and used for storing plug-in IDs and process IDs of plug-ins.

In this embodiment, the plug-in ID and the process ID of the plug-in are recorded, such that the router may later search for the process used by the plug-in according to the plug-in ID, and thus obtain the operational state of the plug-in.

In step 203, a plug-in state request querying an operational state of a plug-in is received from a terminal device.

In this embodiment, after the router is powered on to start, the plug-in state request sent by the terminal device may be received via a network, such that the operational state of the plug-in which the user wants to query may be obtained according to the plug-in state request.

In step 204, the plug-in ID carried in the plug-in state request is obtained.

In this embodiment, the plug-in state request carries the plug-in ID of the plug-in, which the user wants to query. After receiving the plug-in state request, the router obtains the plug-in ID from the plug-in state request first.

In step 205, the process ID corresponding to the plug-in ID is obtained from the preset configuration file.

Based on the above step 204, after obtaining the plug-in ID, the process ID corresponding to the plug-in ID is obtained from the preset configuration file, such that the process used by the plug-in may be searched for according to the process ID.

In step 206, the operational state of the plug-in is obtained according to the process ID.

Based on the above step 205, after obtaining the process ID, a pipeline may be created using popen function, for executing top instructions and pidstat instructions of the Linux system, such that process information corresponding to the process ID is obtained, in which the process information includes a CPU usage, a memory usage and a rate for reading data from a disk and writing data to the disk. The process information is the operational state of the plug-in, i.e., the CPU usage of the plug-in, the memory usage of the plug-in and the rate of reading data from the disk and writing data to the disk.

In this step, at least one from an operational state group consisting of the CPU usage of the plug-in, the memory usage of the plug-in and the rate of writing data to the disk and reading data from the disk may be obtained according to the preset configuration.

In step 207, the operational state of the plug-in is sent to the terminal device, such that the terminal device displays the operational state of the plug-in to the user.

Based on the above step 206, after obtaining the operational state of the plug-in, the router may send the operational state of the plug-in to the terminal device via the network, such that the user may view the actual operational state of the plug-in on the router.

Figure 2B:
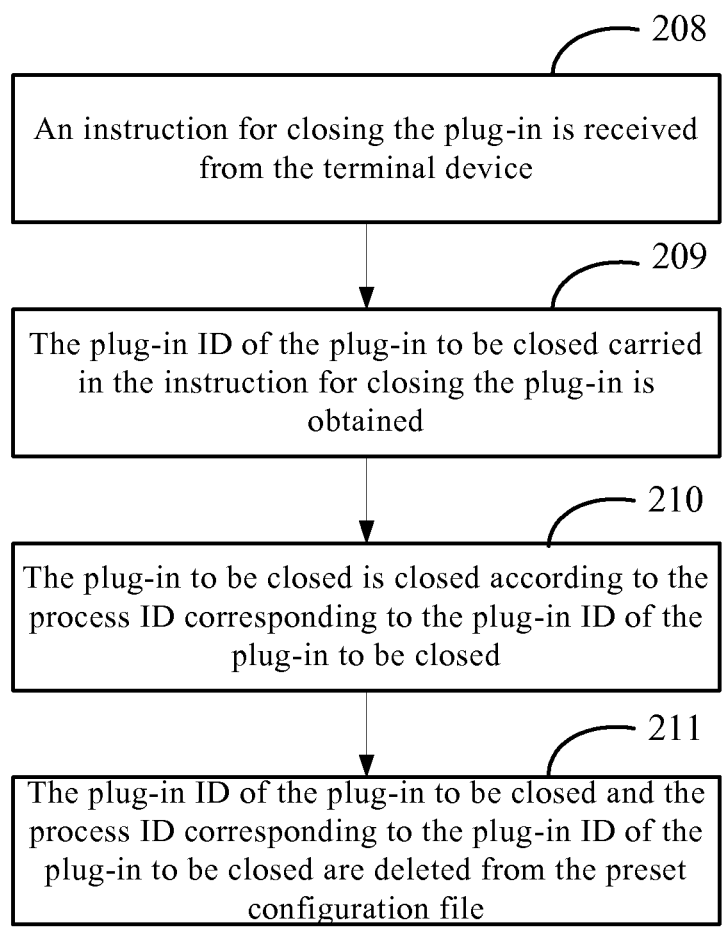
FIG. 2B is a flow chart of another method for controlling a plug-in according to an exemplary embodiment.

Alternatively, in another embodiment, in combination with the embodiment shown in FIG. 2A and referring to FIG. 2B, the method for controlling the plug-in may further include following steps.

In step 208, an instruction for closing the plug-in is received from the terminal device.

In this embodiment, after being powered on to start, the router may receive the instruction for closing the plug-in sent from the terminal device via the network, and may close the plug-in which the user wants to close according to the instruction for closing the plug-in.

In step 209, the plug-in ID of the plug-in to be closed carried in the instruction for closing the plug-in is obtained.

In this embodiment, the instruction for closing the plug-in carries the plug-in ID of the plug-in to be closed which the user wants to close. After receiving the instruction for closing the plug-in, the router obtains the plug-in ID of the plug-in to be closed from the instruction for closing the plug-in first.

In step 210, the plug-in to be closed is closed according to the process ID corresponding to the plug-in ID of the plug-in to be closed.

Based on the above step 209, after obtaining the plug-in ID of the plug-in to be closed, the process ID corresponding to the plug-in ID may be obtained from the preset configuration file, and after obtaining the process ID, the plug-in to be closed may be closed by closing the process.

In step 211, the plug-in ID of the plug-in to be closed and the process ID corresponding to the plug-in ID of the plug-in to be closed are deleted from the preset configuration file.

In this embodiment, after closing the plug-in to be closed according to the instruction for closing the plug-in, the plug-in ID of the plug-in to be closed and the process ID corresponding to the plug-in ID of the plug-in to be closed are deleted from the preset configuration file, so as to update the preset configuration file.

It can be seen that, in this embodiment, the router may close the plug-in which the user wants to close according to the instruction for closing the plug-in sent by the terminal device, such that the user may control the closing of the plug-in.

Figure 2C:
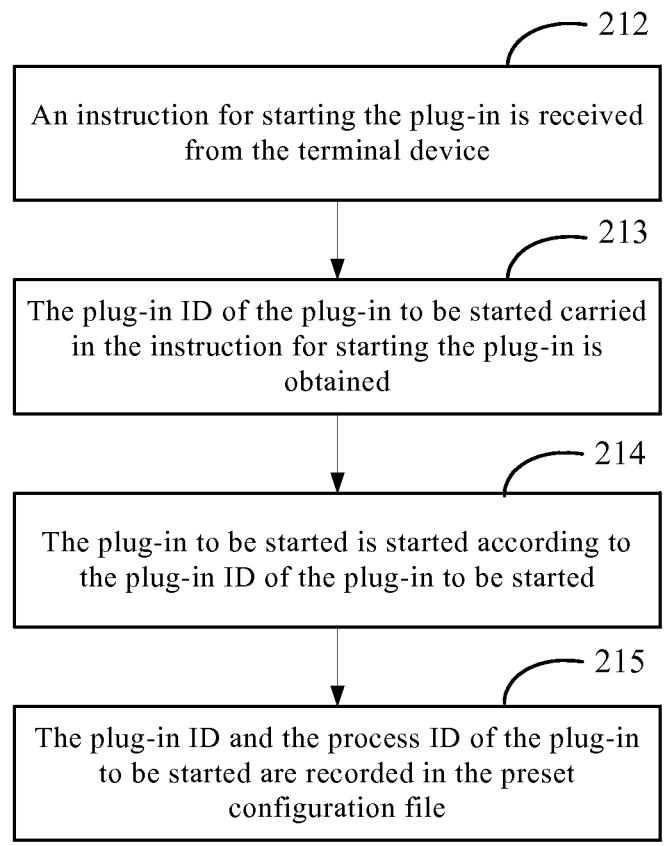
FIG. 2C is a flow chart of another method for controlling a plug-in according to an exemplary embodiment.

Alternatively, in another embodiment, in combination with the embodiment shown in FIG. 2A and referring to FIG. 2C, the method for controlling the plug-in may further include following steps.

In step 212, an instruction for starting the plug-in is received from the terminal device.

In this embodiment, after being powered on to start, the router may receive the instruction for starting the plug-in sent from the terminal device via a network, and may start the plug-in which the user wants to start according to the instruction for starting the plug-in.

In step 213, the plug-in ID of the plug-in to be started carried in the instruction for starting the plug-in is obtained.

In this embodiment, the instruction for starting the plug-in carries the plug-in ID of the plug-in to be started which the user wants to start. After receiving the instruction for starting the plug-in, the router obtains the plug-in ID of the plug-in to be started from the instruction for starting the plug-in first.

In step 214, the plug-in to be started is started according to the plug-in ID of the plug-in to be started.

Based on the above step 213, after obtaining the plug-in ID of the plug-in to be started, concerning the process of starting the plug-in to be started, reference may be made to the process of starting the plug-in described in step 201, i.e., creating a new process and allocating the new process to the plug-in to be started for use.

In step 215, the plug-in ID and the process ID of the plug-in to be started are recorded in the preset configuration file.

Based on the above step 214 and with reference to step 202, after starting the plug-in to be started, the plug-in ID and the process ID of the plug-in to be started are recorded in the preset configuration file.

It can be seen that, in this embodiment, the router may start the plug-in which the user wants to start according to the instruction for starting the plug-in sent by the terminal device, such that the user may control the starting of the plug-in.

Figure 3:
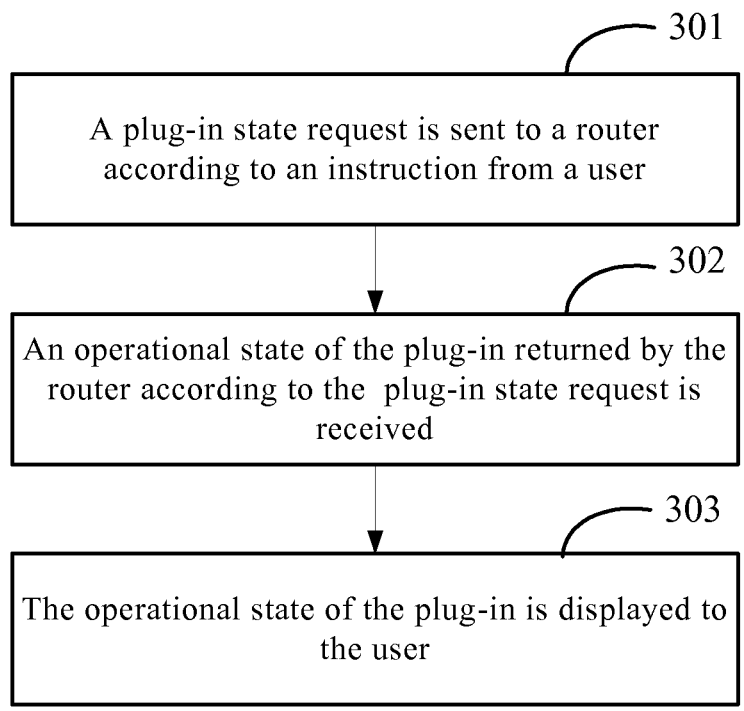
FIG. 3 is a flow chart of another method for controlling a plug-in according to an exemplary embodiment.

FIG. 3 is a flow chart of another method for controlling a plug-in according to an exemplary embodiment.

As shown in FIG. 3, the method for controlling the plug-in is applied in a terminal device and includes following steps.

In step 301, a plug-in state request querying an operational state of a plug-in is sent to a router according to an instruction from a user.

In this embodiment, the user may control the plug-in via the terminal device, and may realize his/her requirements by sending the plug-in state request when he/she wants to query the operational state of the plug-in running on the router.

The plug-in state request carries a plug-in ID of the plug-in, which the user wants to query, such that the router may querying the operational state according to the plug-in ID.

In step 302, the operational state of the plug-in returned by the router according to the plug-in state request is received.

In step 303, the operational state of the plug-in is displayed to the user.

In this embodiment, after receiving the operational state of the plug-in returned by the router, the terminal device displays the operational state to the user. The terminal device may display the operational state of the plug-in to the user in many ways, such as displaying the operational state of the plug-in via a user interface or voice broadcasting of the operational state of the plug-in.

It can be seen that, in this embodiment, the user may send the plug-in state request to the router via the terminal device, such that the router obtains the operational state of the plug-in which the user wants to query according to the plug-in state request. The terminal device displays the operational state to the user after receiving the operational state of the plug-in returned by the router, such that the user may view the actual operational state of the plug-in on the router.

Figure 4:
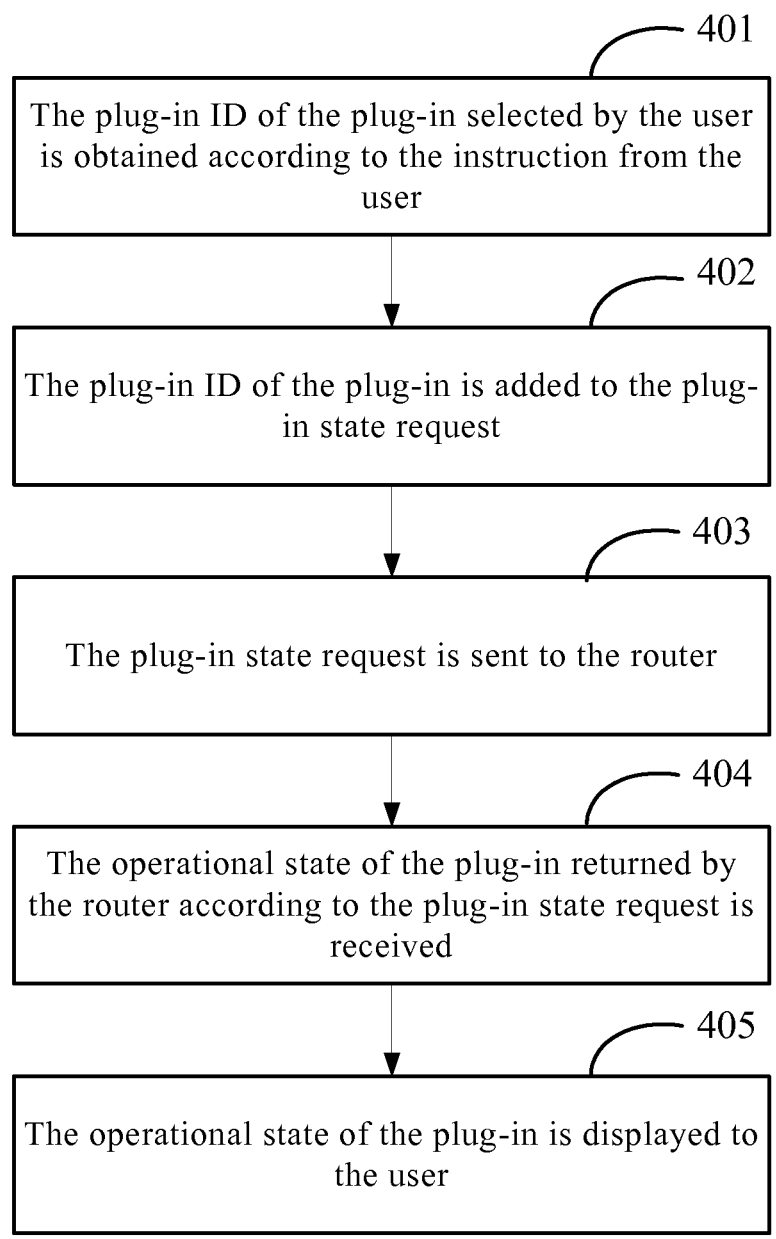
FIG. 4 is a flow chart of another method for controlling a plug-in according to an exemplary embodiment.

FIG. 4 is a flow chart of another method for controlling a plug-in according to an exemplary embodiment.

As shown in FIG. 4, the method for controlling the plug-in is applied in a terminal device and includes following steps.

In step 401, a plug-in ID of a plug-in selected by a user is obtained according to an instruction from the user.

In this embodiment, the user may control the plug-in via a terminal device such as a mobile equipment or a personal computer. For example, the user may realize control on the plug-in via applications installed in a smart phone, a personal digital assistant, or a notebook computer.

When the user wants to control the plug-in, the user is generally required to log in for the purpose of access security. After logging in, an identity of the user is verified, and when the identity verification is successful, the router will send the loaded plug-in list to the terminal device for displaying the list to the user. Generally, the list includes all the plug-ins installed in the router and a state of each plug-in, in which the state may be running or non-running In the actual implementation, the router may send states of the plug-ins to the terminal device periodically. Alternatively, the terminal device may request current states of the plug-ins for the router when the user uses the application installed in the terminal device. This is not limited in the present disclosure.

When the user selects to query the operational state of a certain running plug-in in the list, the plug-in ID of the plug-in selected by the user is obtained. The plug-in ID is stored in the terminal device in advance. For example, the terminal device may send the plug-in IDs of the plug-ins together with the states of the plug-ins to the terminal device.

In step 402, the plug-in ID is added to the plug-in state request.

Based on the above step 401, when the user wants to query the operational state of a certain plug-in, the obtained plug-in ID of the plug-in is added to the plug-in state request, such that the router obtains the operational state of the plug-in according to the plug-in ID.

In step 403, the plug-in state request querying the operational state of the plug-in is sent to the router.

In step 404, the operational state of the plug-in returned by the router according to the plug-in state request is received.

In step 405, the operational state of the plug-in is displayed to the user.

In this step, the terminal device displays the received operational state of the plug-in to the user for viewing.

The operational state of the plug-in may be displayed to the user in many ways.

Figure 5:
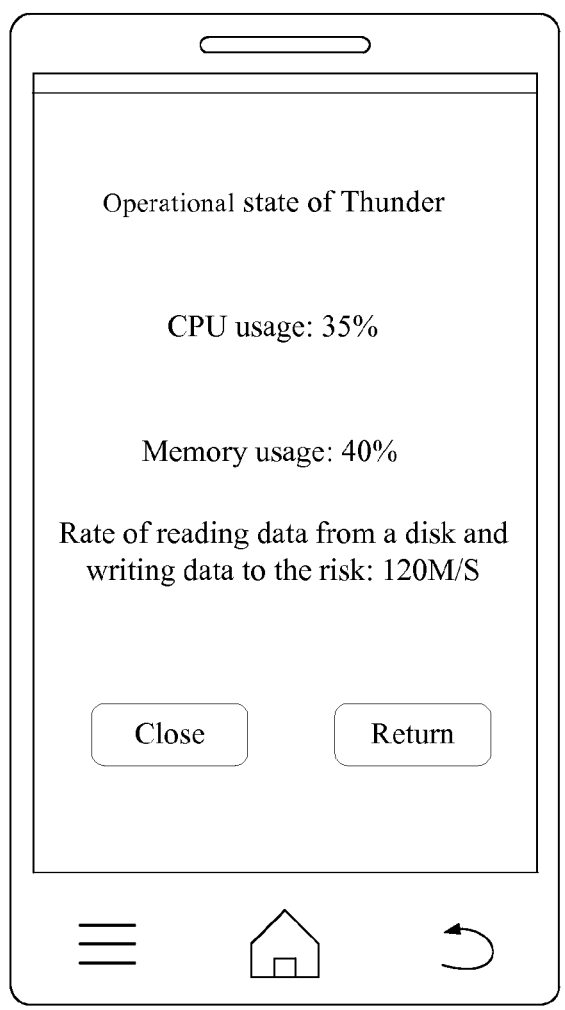
FIG. 5 is a schematic diagram of a user interface according to an exemplary embodiment.

For example, a user interface is generated according to the operational state of the plug-in and the user interface is displayed. In this way, the terminal device may display the operational state of the plug-in to the user in a form of text or images via the user interface, such that the user may intuitively know the operational state of the plug-in. Referring to FIG. 5, an exemplary embodiment of the present disclosure illustrates a schematic diagram of the user interface. It can be seen from FIG. 5 that, the operational state of Thunder plug-in, which the user wants to query, includes 35% CPU usage, 40% memory usage, and reading data from a disk or writing data to the disk at 120 M/s.

For another example, the operational state of the plug-in is broadcast via voice, such that the user may know the operational state of the plug-in when it is inconvenient for him/her to look at the screen of the terminal device.

Alternatively, in another embodiment, in combination with the embodiment shown in FIG. 4, after receiving the operational state of the plug-in returned by the router, the terminal device may judge whether the operational state of the plug-in reaches a preset warning threshold.

The preset warning threshold is a threshold affecting the routing function of the router. This is because, for the router, the basic function is the routing function, which satisfies a web surfing requirement of the user. Once the plug-in running on the router occupies too many resources, it will affect the routing function of the router, and thus affect the normal web surfing requirement of the user. Therefore, in the present disclosure, the preset warning threshold is stored in the terminal device in advance, it is judged whether the operational state of the plug-in reaches the preset warning threshold when the operational state of the plug-in is received, and the user may be warned by means of the user interface or the voice broadcasting if the operational state of the plug-in reaches the preset warning threshold.

It can be seen that, in this embodiment, by presetting the warning threshold in the terminal device and warning the user when the operational state of the plug-in returned by the router reaches the preset warning threshold, the user may be prompted in time when the plug-in occupies too many resources and affects the routing function of the router.

Alternatively, in another embodiment, in combination with the embodiment shown in FIG. 4, the terminal device may provide an option for closing the plug-in for the user. When the user selects to close a certain plug-in, the terminal device obtains the plug-in ID of the plug-in, and then sends the plug-in ID to the router by carrying the plug-in ID in the instruction for closing the plug-in, so as to control the router to close the plug-in, thus realizing control on the closing of the router. For example, when the operational state of the Thunder plug-in, which the user wants to query, exceeds the preset warning threshold, the user may select to close the Thunder plug-in for retaining the resources of the router.

Alternatively, in another embodiment, in combination with the embodiment shown in FIG. 4, an option for starting the plug-in may be provided in the terminal device. When the user selects to start a certain plug-in, the terminal device obtains the plug-in ID of the plug-in and then sends the plug-in ID to the router by carrying the plug-in ID in the instruction for starting the plug-in, so as to control the router to start the plug-in, thus realizing control on the starting of the plug-in. For example, when the user is in office and nobody requires internet access at home, the user may select to start the Thunder plug-in for downloading films.

Figure 6:
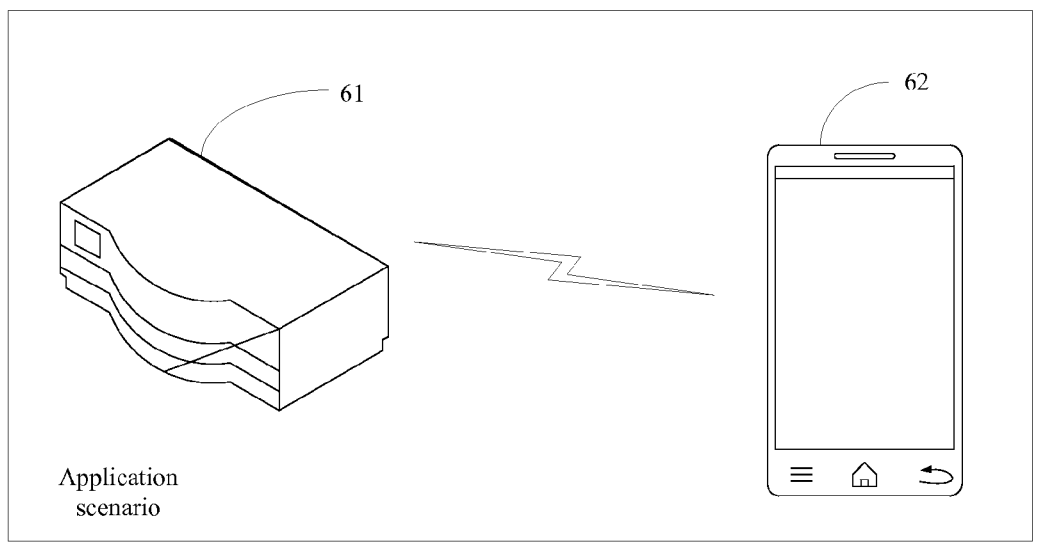
FIG. 6 is a schematic diagram showing an application scenario of controlling a plug-in according to an exemplary embodiment.
Figure 7:
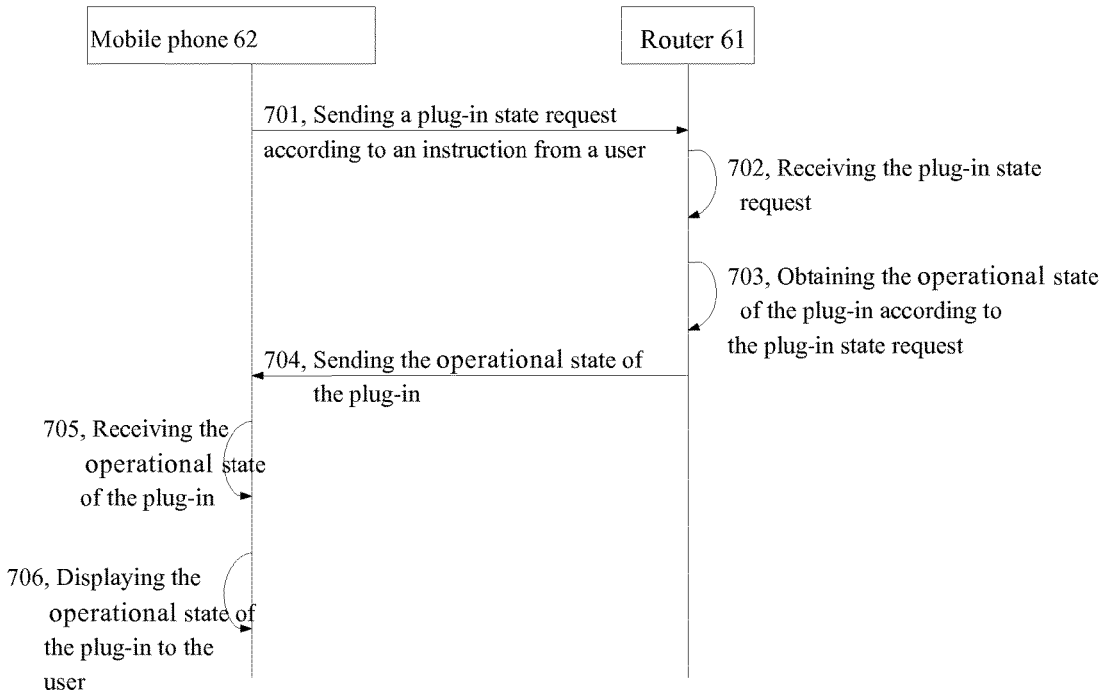
FIG. 7 is a flow chart of another method for controlling a plug-in according to an exemplary embodiment.

In combination with above mentioned method embodiments, FIG. 6 shows a schematic diagram showing an application scenario of controlling a plug-in according to an exemplary embodiment, and FIG. 7 shows a flow chart of another method for controlling a plug-in according to an exemplary embodiment.

It is assumed that the application scenario shown in FIG. 6 is that a user controls plug-ins on the router located at home, in which a router 61 is located in the user's home, the user is in office and controls the plug-ins running on the router 61 via a mobile phone 62.

Referring to FIG. 7, the user controls the plug-ins on the router 61 via the mobile phone 62 by performing following steps.

In step 701, the mobile phone 62 sends a plug-in state request querying an operational state of a plug-in to the router 61 according to an instruction from the user.

In step 702, the router 61 receives the plug-in state request sent from the mobile phone 62.

In step 703, the router 61 obtains the operational state of the plug-in according to the plug-in state request.

In step 704, the router 61 sends the operational state of the plug-in to the mobile phone 62.

In step 705, the mobile phone 62 receives the operational state of the plug-in returned by the router 61.

In step 706, the mobile phone 62 displays the operational state of the plug-in to the user.

In the application scenario of controlling the plug-in shown in FIG. 6, the mobile phone 62 may control the plug-in installed in the router 61 by adopting the method embodiment shown in FIG. 3 or FIG. 4. The router 61 may cooperate with the mobile phone 62 by adopting the method embodiment shown in FIG. 1 or FIG. 2, which is not elaborated herein.

Corresponding to the above embodiments of the method for controlling the plug-in, the present disclosure also provides embodiments of a device for controlling a plug-in, embodiments of a terminal device and embodiments of a router.

Figure 8:
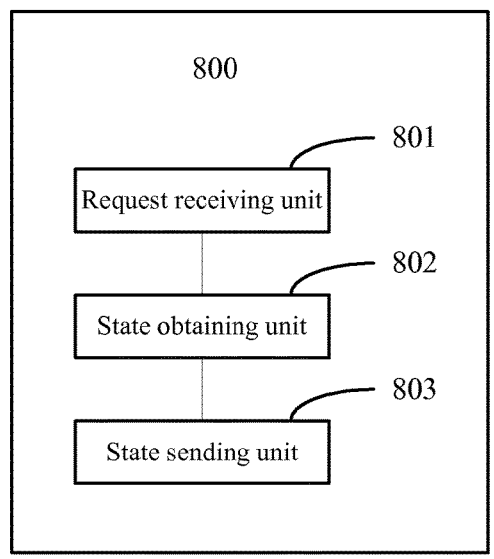
FIG. 8 is a block diagram of an apparatus for controlling a plug-in according to an exemplary embodiment.

FIG. 8 is a block diagram of an apparatus for controlling a plug-in according to an exemplary embodiment. The apparatus may be applied in a router.

As shown in FIG. 8, the apparatus 800 includes a request receiving unit 801, a state obtaining unit 802 and a state sending unit 803.

The request receiving unit 801 is configured to receive a plug-in state request querying an operational state of a plug-in from a terminal device.

The state obtaining unit 802 is configured to obtain the operational state of the plug-in according to the plug-in state request.

The state sending unit 803 is configured to send the operational state of the plug-in to the terminal device for displaying the operational state of the plug-in to a user.

In the above embodiment, the router may obtain the operational state of the plug-in which the user wants to query according to the plug-in state request sent by the terminal device, and then send the operational state of the plug-in to the terminal device, such that the user may query the actual operational state of the plug-in on the router.

Figure 9:
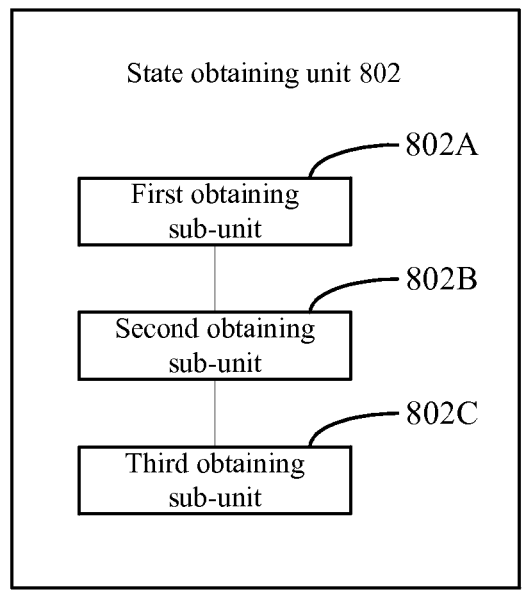
FIG. 9 is a block diagram of another apparatus for controlling a plug-in according to an exemplary embodiment.

FIG. 9 is a block diagram of another apparatus for controlling a plug-in according to an exemplary embodiment. The apparatus may be applied in a router. Based on the above embodiment shown in FIG. 8, the state obtaining unit 802 in this embodiment may include a first obtaining sub-unit 802A, a second obtaining sub-unit 802B and a third obtaining sub-unit 802C.

The first obtaining sub-unit 802A is configured to obtain a plug-in ID carried in the plug-in state request.

The second obtaining sub-unit 802B is configured to obtain a process ID corresponding to the plug-in ID from a preset configuration file.

The third obtaining sub-unit 802C is configured to obtain the operational state of the plug-in according to the process ID.

In the above embodiment, the process ID used by the plug-in may be obtained according to the plug-in ID, and then the operational state of the plug-in may be obtained according to the process ID.

Figure 10:
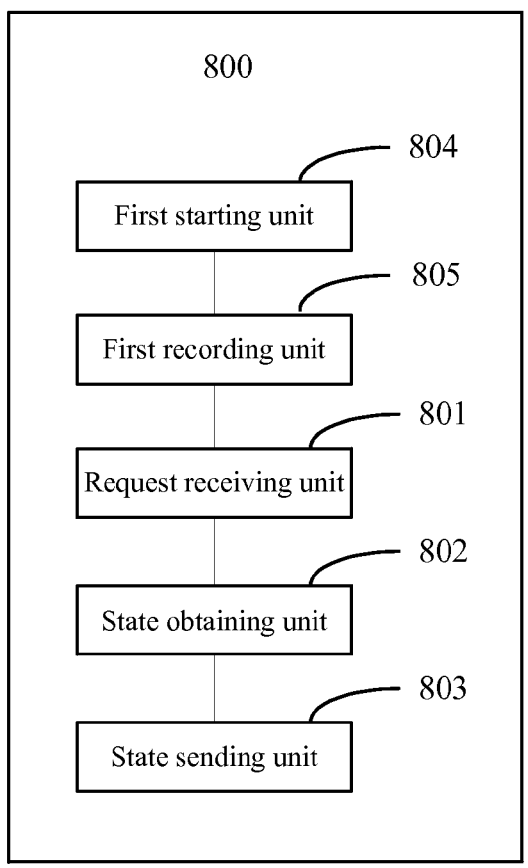
FIG. 10 is a block diagram of another apparatus for controlling a plug-in according to an exemplary embodiment.

FIG. 10 is a block diagram of another apparatus for controlling a plug-in according to an exemplary embodiment. The apparatus may be applied in a router. Based on the above embodiment shown in FIG. 8, the apparatus in this embodiment may further include a first starting unit 804 and a first recording unit 805.

The first starting unit 804 is configured to start the plug-in according to a preset configuration after the router is powered on.

The first recording unit 805 is configured to record the process ID and the plug-in ID of the plug-in in the preset configuration file.

In the above embodiment, by recording the plug-in ID and the process ID of the plug-in, the router may search for the process used by the plug-in according to the plug-in ID, and thus obtain the operational state of the plug-in.

It should be noted that, the first starting unit 804 and the first recording unit 805 included in the above apparatus embodiment shown in FIG. 10 may also be included in the apparatus embodiments shown in FIG. 8 and FIG. 9, which is not limited herein.

Figure 11:
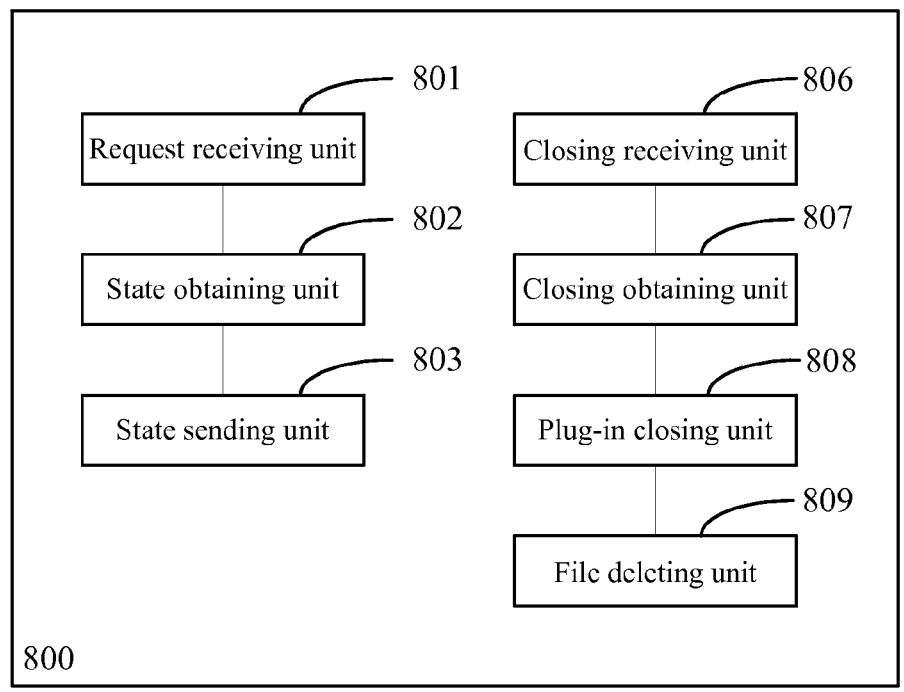
FIG. 11 is a block diagram of another apparatus for controlling a plug-in according to an exemplary embodiment.

FIG. 11 is a block diagram of another apparatus for controlling a plug-in according to an exemplary embodiment. The apparatus may be applied in a router. Based on the above embodiment shown in FIG. 8, the apparatus in this embodiment may further include a closing receiving unit 806, a closing obtaining unit 807, a plug-in closing unit 808 and a file deleting unit 809.

The closing receiving unit 806 is configured to receive an instruction for closing the plug-in from the terminal device.

The closing obtaining unit 807 is configured to obtain the plug-in ID of the plug-in to be closed, in which the plug-in ID of the plug-in to be closed is carried in the instruction for closing the plug-in.

The plug-in closing unit 808 is configured to close the plug-in to be closed according to the process ID corresponding to the plug-in ID of the plug-in to be closed.

The file deleting unit 809 is configured to delete the plug-in ID and the process ID of the plug-in to be closed from the preset configuration file.

In the above embodiment, the plug-in which the user wants to close may be closed according to the instruction for closing the plug-in sent by the terminal device, such that the user may control the closing of the plug-in.

It should be noted that, the closing receiving unit 806, the closing obtaining unit 807, the plug-in closing unit 808 and the file deleting unit 809 included in the apparatus embodiment shown in FIG. 11 may also be included in any one of apparatus embodiments shown in FIG. 8, FIG. 9 and FIG. 10, which is not limited herein.

Figure 12:
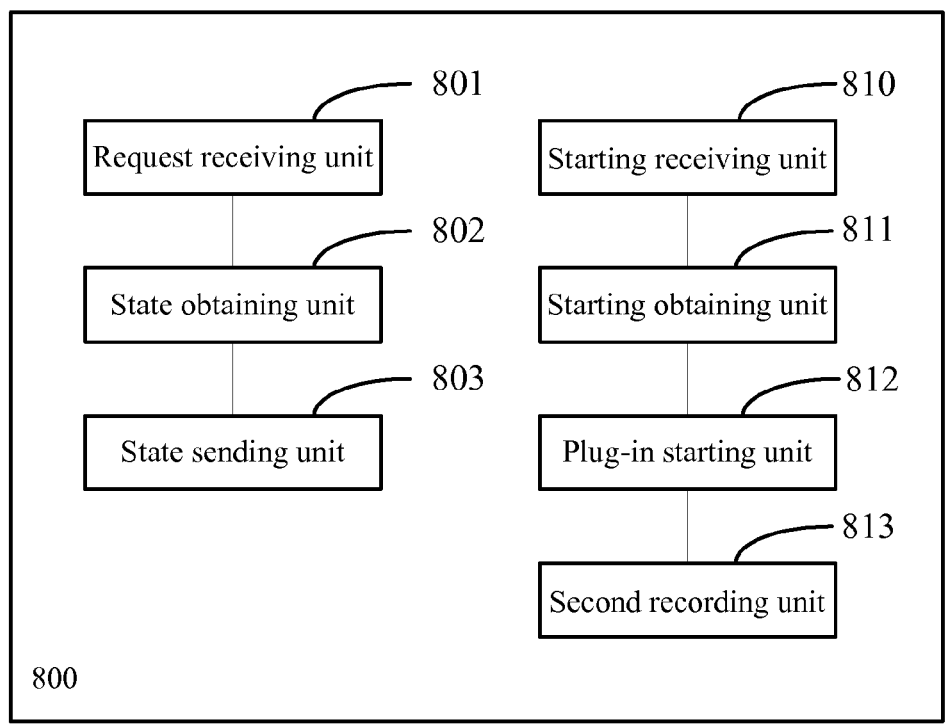
FIG. 12 is a block diagram of another apparatus for controlling a plug-in according to an exemplary embodiment.

FIG. 12 is a block diagram of another apparatus for controlling a plug-in according to an exemplary embodiment. The apparatus may be applied in a router. Based on the above embodiment shown in FIG. 8, the apparatus in this embodiment may further include a starting receiving unit 810, a starting obtaining unit 811, a plug-in starting unit 812 and a second recording unit 813.

The starting receiving unit 810 is configured to receive an instruction for starting the plug-in from the terminal device.

The starting obtaining unit 811 is configured to obtain the plug-in ID of the plug-in to be started, in which the plug-in ID of the plug-in to be started is carried in the instruction for starting the plug-in.

The plug-in starting unit 812 is configured to start the plug-in to be started according to the plug-in ID of the plug-in to be started.

The second recording unit 813 is configured to record the plug-in ID and the process ID of the plug-in to be started in the preset configuration file.

In the above embodiment, the plug-in which the user wants to start may be started according to the instruction for starting the plug-in sent by the terminal device, such that the user may control the starting of the plug-in.

It should be noted that, the starting receiving unit 810, the starting obtaining unit 811, the plug-in starting unit 812 and the second recording unit 813 included in the apparatus embodiment shown in FIG. 12 may also be included in any one of apparatus embodiments shown in FIG. 8 to FIG. 11, which is not limited herein.

Figure 13:
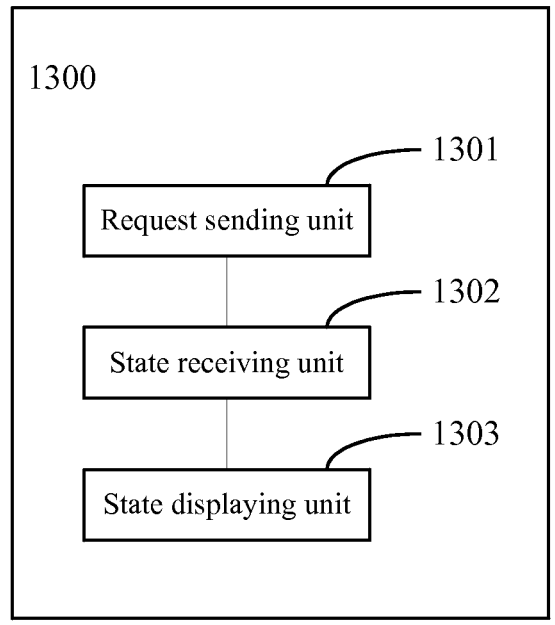
FIG. 13 is a block diagram of another apparatus for controlling a plug-in according to an exemplary embodiment.

FIG. 13 is a block diagram of another apparatus for controlling a plug-in according to an exemplary embodiment. The apparatus may be applied in a terminal device.

As shown in FIG. 13, the apparatus 1300 includes a request sending unit 1301, a state receiving unit 1302 and a state displaying unit 1303.

The request sending unit 1301 is configured to send a plug-in state request querying an operational state of a plug-in to a router according to an instruction from a user.

The state receiving unit 1302 is configured to receive the operational state of the plug-in returned by the router according to the plug-in state request.

The state displaying unit 1303 is configured to display the operational state of the plug-in to the user.

In the above embodiment, the user may send the plug-in state request to the router via the terminal device, such that the router obtains the operational state of the plug-in which the user wants to query according to the plug-in state request, and the terminal device displays the operational state to the user after receiving the operational state of the plug-in returned by the router, and thus the user may query the actual operational state of the plug-in on the router.

Figure 14:
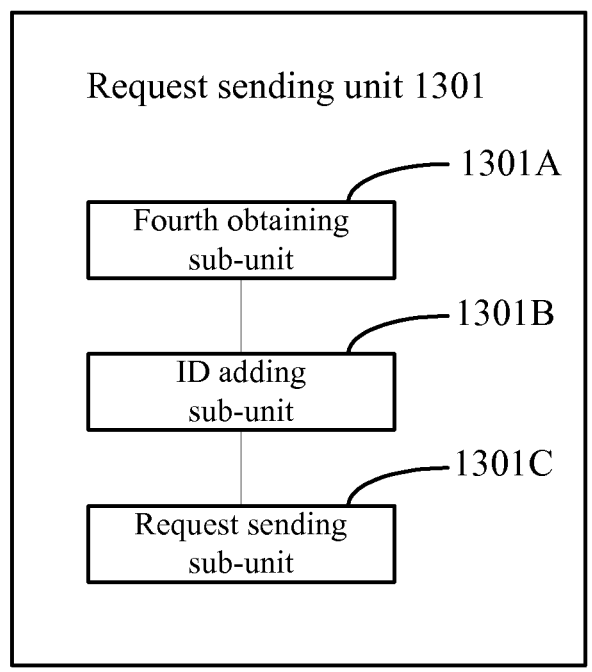
FIG. 14 is a block diagram of another apparatus for controlling a plug-in according to an exemplary embodiment.

FIG. 14 is a block diagram of another apparatus for controlling a plug-in according to an exemplary embodiment. The apparatus may be applied in a terminal device. Based on the embodiment shown in FIG. 13, the request sending unit 1301 in this embodiment may include a fourth obtaining sub-unit 1301A, an ID adding sub-unit 1301B and a request sending sub-unit 1301C.

The fourth obtaining sub-unit 1301A is configured to obtain a plug-in ID of a plug-in selected by the user according to the instruction from the user.

The ID adding sub-unit 1301B is configured to add the plug-in ID to the plug-in state request.

The request sending sub-unit 1301C is configured to send the plug-in state request querying an operational state of a plug-in to the router.

In the above embodiment, by adding the plug-in ID to the plug-in state request, the router may obtain the operational state of the plug-in according to the plug-in ID.

Figure 15:
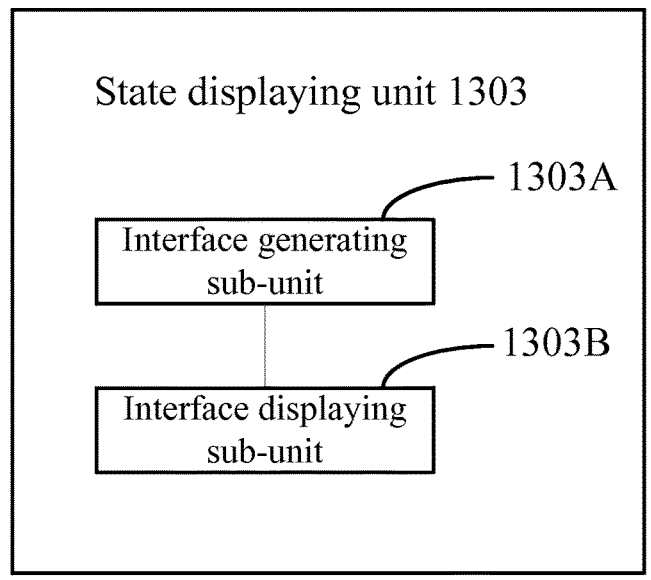
FIG. 15 is a block diagram of another apparatus for controlling a plug-in according to an exemplary embodiment.

FIG. 15 is a block diagram of another apparatus for controlling a plug-in according to an exemplary embodiment. The apparatus may be applied in a terminal device. Based on the embodiment shown in FIG. 13, the state displaying unit 1303 in this embodiment may include an interface generating sub-unit 1303A and an interface displaying sub-unit 1303B.

The interface generating sub-unit 1303A is configured to generate a user interface according to the operational state of the plug-in.

The interface displaying sub-unit 1303B is configured to display the user interface.

In the above embodiment, the operational state of the plug-in is displayed to the user via the user interface, such that the user may intuitively obtain the operational state of the plug-in.

It should be noted that, the state displaying unit 1303 included in the apparatus embodiment shown in FIG. 15 may also be included in the apparatus embodiment shown in FIG. 14, which is not limited herein.

Figure 16:
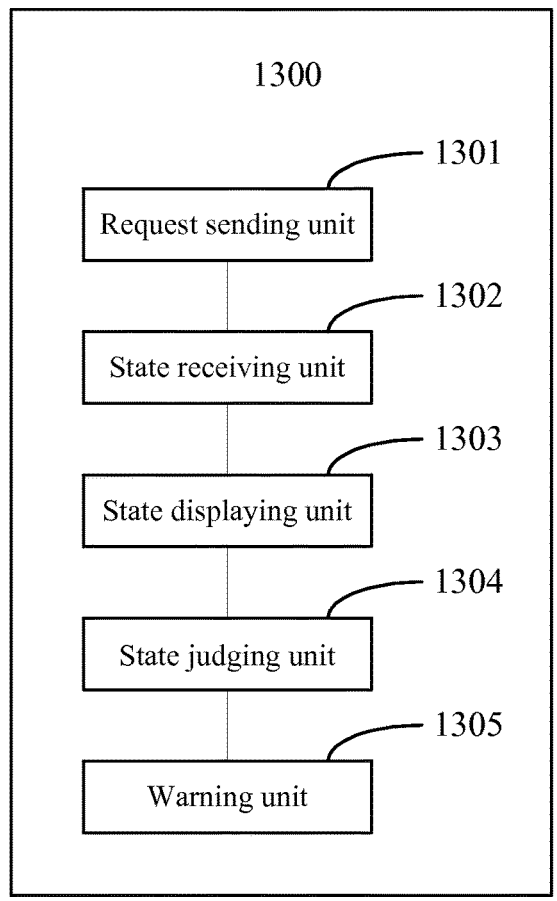
FIG. 16 is a block diagram of another apparatus for controlling a plug-in according to an exemplary embodiment.

FIG. 16 is a block diagram of another apparatus for controlling a plug-in according to an exemplary embodiment. The apparatus may be applied in a terminal device. Based on the embodiment shown in FIG. 13, the apparatus in this embodiment may further include a state judging unit 1304 and a warning unit 1305.

The state judging unit 1304 is configured to judge whether the operational state of the plug-in reaches a predetermined warning threshold.

The warning unit 1305 is configured to warn the user if the operational state of the plug-in reaches the predetermined warning threshold.

In the above embodiment, by presetting the warning threshold in the terminal device, when the terminal device receives the operational state of the plug-in returned by the router, a warning may be sent to the user if the operational state of the plug-in reaches the preset warning threshold, such that the user may be prompted in time when the plug-in occupies too many resources and affects the routing function of the router.

It should be noted that, the state judging unit 1304 and the warning unit 1305 included in the apparatus embodiment shown in FIG. 16 may also be included in any one of apparatus embodiments shown in FIG. 13 to FIG. 15, which is not limited herein.

With respect to the apparatuses in the above embodiments, the specific operation modes of individual modules therein have been described in detail in the embodiments regarding the methods for controlling the plug-in, which will not be elaborated herein.

Since the apparatus embodiments are substantially corresponding to the method embodiments, concerning the related aspects, reference may be made to the description in the method embodiments. The apparatus embodiments described above are only exemplary, and units illustrated as separate components therein may be or may not be physically separated from each other, and components represented as units may be or may not be physical units, i.e., may be located in a same place or may be distributed in multiple network units. Some or all of the modules may be selected according to the actual requirements so as to achieve objectives of the present disclosure, which may be understood or implemented by those skilled in the art without creative work.

Accordingly, the present disclosure also provides a non-transitory computer-readable storage medium having stored therein instructions that, when executed by a processor of a router, causes the router to perform a method for controlling a plug-in. The method includes: receiving a plug-in state request querying an operational state of a plug-in sent from a terminal device; obtaining the operational state of the plug-in according to the plug-in state request; and sending the operational state of the plug-in to the terminal device.

Accordingly, the present disclosure also provides a non-transitory computer-readable storage medium having stored therein instructions that, when executed by a processor of the terminal device, causes the terminal device to perform a method for controlling a plug-in. The method includes: sending a plug-in state request querying an operational state of a plug-in to a router according to an instruction from a user; receiving the operational state of a plug-in returned by the router according to the plug-in state request; and displaying the operational state of the plug-in to the user.

Figure 17:
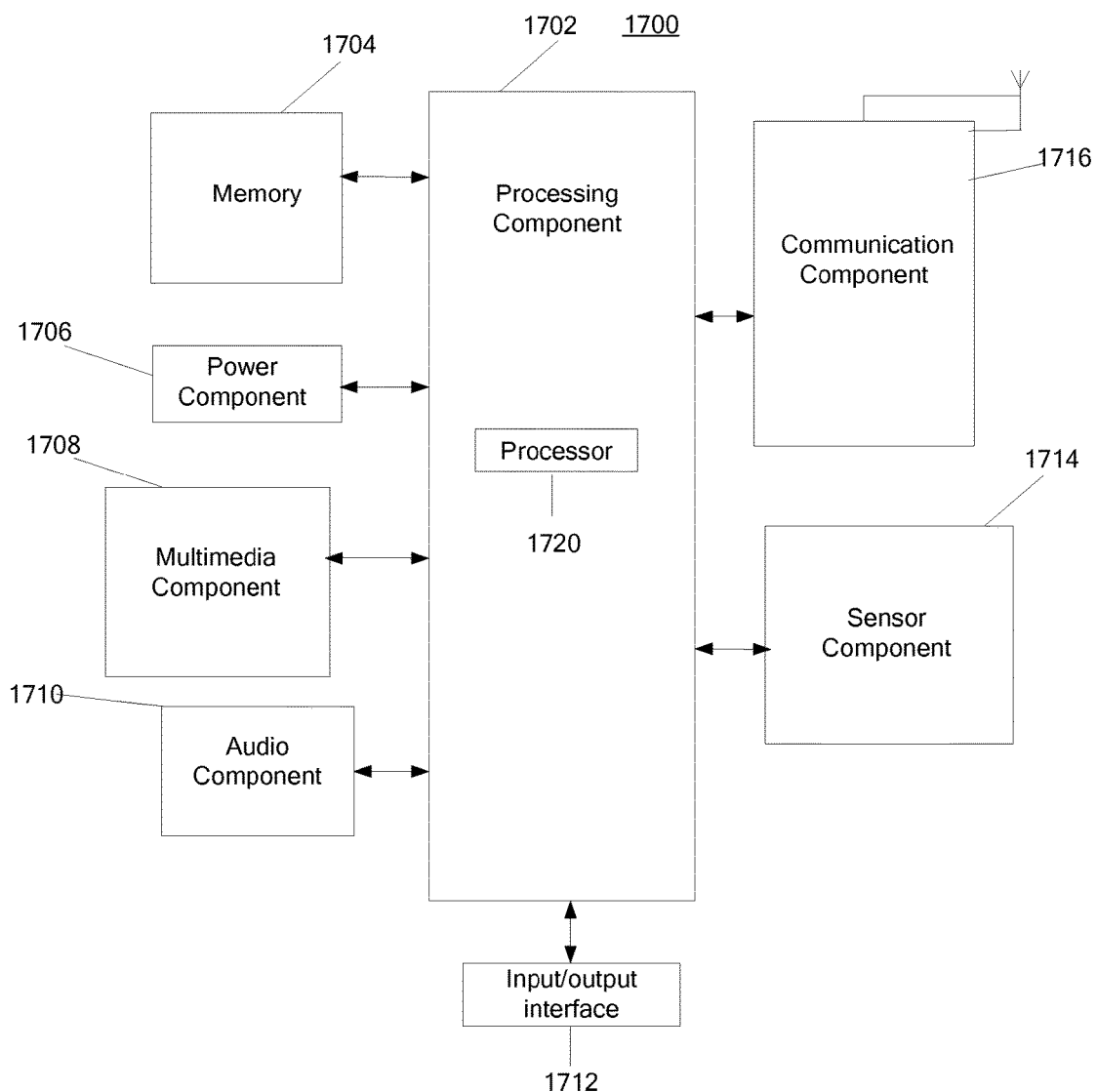
FIG. 17 is a schematic diagram of a terminal device for controlling a plug-in according to an exemplary embodiment.

FIG. 17 is a block diagram of a terminal device 1700 for controlling a plug-in according to an exemplary embodiment. For example, the terminal device 1700 may be a mobile phone, a computer, a digital broadcast terminal, a message transceiver, a game console, a tablet, a medical device, an exercise equipment, a personal digital assistant, and the like.

Referring to FIG. 17, the terminal device 1700 may include one or more of the following components: a processing component 1702, a memory 1704, a power component 1706, a multimedia component 1708, an audio component 1710, an input/output (I/O) interface 1712, a sensor component 1714, and a communication component 1716.

The processing component 1702 typically controls overall operations of the terminal device 1700, such as the operations associated with display, telephone calls, data communications, camera operations, and recording operations. The processing component 1702 may include one or more processors 1720 to execute instructions to perform all or part of the steps in the above described methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the terminal device 1700. Examples of such data include instructions for any applications or methods operated on the terminal device 1700, contact data, phonebook data, messages, pictures, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the terminal device 1700. The power component 1706 may include a power management system, one or more power sources, and any other components associated with the generation, management, and distribution of power in the terminal device 1700.

The multimedia component 1708 includes a screen providing an output interface between the terminal device 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 1708 includes a front camera and/or a rear camera. The front camera and the rear camera may receive external multimedia data while the terminal device 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone (MIC) configured to receive an external audio signal when the terminal device 1700 is in an operation mode, such as a call mode, a recording mode, and a voice recognition mode. The received audio signal may be further stored in the memory 1704 or transmitted via the communication component 1716. In some embodiments, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the terminal device 1700. For instance, the sensor component 1714 may detect an open/closed status of the terminal device 1700 and relative positioning of components (e.g., the display and the keypad of the terminal device 1700). The sensor component 1714 may also detect a change in position of the terminal device 1700 or of a component in the terminal device 1700, a presence or absence of user contact with the terminal device 1700, an orientation or an acceleration/deceleration of the terminal device 1700, and a change in temperature of the terminal device 1700. The sensor component 1714 may include a proximity sensor configured to detect the presence of nearby objects without any physical contact. The sensor component 1714 may also include a light sensor, such as a CMOS or CCD image sensor, for use in imaging applications. In some embodiments, the sensor component 1714 may also include an accelerometer sensor, a gyroscope sensor, a magnetic sensor, a pressure sensor, or a temperature sensor.

The communication component 1716 is configured to facilitate wired or wireless communication between the terminal device 1700 and other devices. The terminal device 1700 can access a wireless network based on a communication standard, such as WiFi, 2G, or 3G, or a combination thereof. In one exemplary embodiment, the communication component 1716 receives a broadcast signal or broadcast associated information from an external broadcast management system via a broadcast channel. In one exemplary embodiment, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 1704 including instructions. The above instructions are executable by the processor 1720 in the terminal device 1700, for performing the above-described methods. For example, the non-transitory computer-readable storage medium may be a ROM, a RAM, a CD-ROM, a magnetic tape, a floppy disc, an optical data storage device, and the like.

Figure 18:
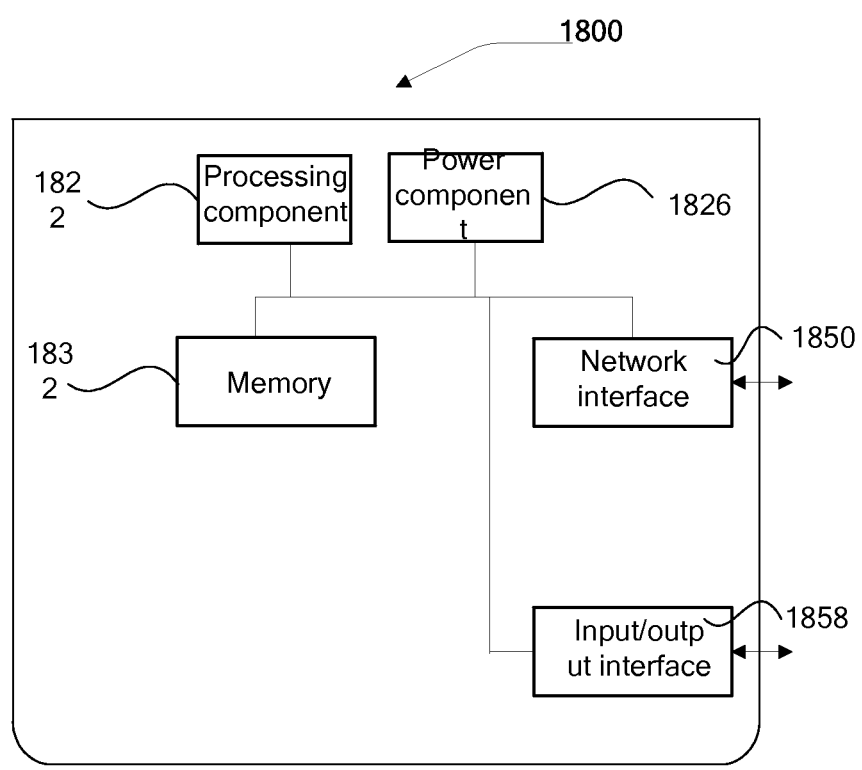
FIG. 18 is another schematic diagram of a device for controlling a plug-in according to an exemplary embodiment.

FIG. 18 is a block diagram of a device 1800 for controlling a plug-in according to an exemplary embodiment. For example, the device 1800 may be configured as a router. Referring to FIG. 18, the device 1800 includes a processing component 1822 which further includes one or more processors, and a memory resource which is represented by a memory 1832, and used for storing instructions (for example, application programs) executable by the processing component 1822. The application programs stored in the memory 1832 may include one or more modules, and each module corresponds to one set of instructions. Furthermore, the processing component 1822 is configured to execute instructions, so as to execute the above method for controlling the plug-in.

The device 1800 may further include a power component 1826 configured to perform power management on the device 1800, a wired or wireless network interface 1850 configured to connect the device 1800 with the network, and an input/output (I/O) interface 1858. The device 1800 may be operated based on the operating system stored in the memory 1832, such as Windows Server™, Mac OS X™, Unix™, Linux™, FreeBSD™ or the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling a plug-in by a router, comprising:
    receiving a plug-in state request querying an operational state of a plug-in sent from a terminal device;
    obtaining a plug-in ID carried in the plug-in state request;
    obtaining a process ID corresponding to the plug-in ID from a preset configuration file;
    obtaining the operational state of the plug-in according to the process ID;
    sending the operational state of the plug-in to the terminal device;
    receiving an instruction for closing the plug-in from the terminal device;
    obtaining the plug-in ID of the plug-in to be closed, wherein the plug-in ID of the plug-in to be closed is carried in the instruction for closing the plug-in;
    closing the plug-in to be closed according to the process ID corresponding to the plug-in ID of the plug-in to be closed; and
    deleting the plug-in ID and the process ID of the plug-in to be closed from the preset configuration file.

2. The method according to claim 1, further comprising:
    starting the plug-in according to a preset configuration after powering on the router; and
    recording the process ID and the plug-in ID of the plug-in in the preset configuration file.

3. The method according to claim 1, further comprising:
    receiving an instruction for starting the plug-in from the terminal device;
    obtaining the plug-in ID of the plug-in to be started, wherein the plug-in ID of the plug-in to be started is carried in the instruction for starting the plug-in;
    starting the plug-in to be started according to the plug-in ID of the plug-in to be started; and
    recording the plug-in ID and the process ID of the plug-in to be started in the preset configuration file.

4. The method according to claim 3, wherein the operational state of the plug-in comprises at least one from a group consisting of a CPU usage of the plug-in, a memory usage of the plug-in and a rate of writing data to a disk and reading data from the disk.

5. A method for controlling a plug-in by a terminal device, comprising:
    sending a plug-in state request querying an operational state of a plug-in to a router according to an instruction from a user;
    receiving the operational state of a plug-in returned by the router according to the plug-in state request, wherein the operational state of the plug-in returned by the router is obtained by:
        obtaining a plug-in ID carried in the plug-in state request;
        obtaining a process ID corresponding to the plug-in ID from a preset configuration file;
        obtaining the operational state of the plug-in according to the process ID;
    displaying the operational state of the plug-in to the user;
    sending an instruction for closing the plug-in to the router, wherein the router is configured to:
        obtain the plug-in ID of the plug-in to be closed, wherein the plug-in ID of the plug-in to be closed is carried in the instruction for closing the plug-in;
        close the plug-in to be closed according to the process ID corresponding to the plug-in ID of the plug-in to be closed; and
        delete the plug-in ID and the process ID of the plug-in to be closed from the preset configuration file.

6. The method according to claim 5, wherein sending the plug-in state request to the router according to an instruction from a user comprises:
    obtaining a plug-in ID of a plug-in selected by the user according to the instruction from the user;
    adding the plug-in ID to the plug-in state request; and
    sending the plug-in state request to the router.

7. The method according to claim 5, wherein displaying the operational state of the plug-in to the user comprises:
    generating a user interface according to the operational state of the plug-in; and
    displaying the user interface.

8. The method according to claim 5, further comprising:
    determining whether the operational state of the plug-in reaches a predetermined warning threshold; and
    warning the user if the operational state of the plug-in reaches the predetermined warning threshold.

9. A router, comprising: a processor; a memory configured to store instructions executable by the processor; wherein the processor is configured to perform:
    receiving a plug-in state request querying an operational state of a plug-in sent from a terminal device;
    obtaining a plug-in ID carried in the plug-in state request;
    obtaining a process ID corresponding to the plug-in ID from a preset configuration file;
    obtaining the operational state of the plug-in according to the process ID;
    sending the operational state of the plug-in to the terminal device;
    receiving an instruction for closing the plug-in from the terminal device;
    obtaining the plug-in ID of the plug-in to be closed, wherein the plug-in ID of the plug-in to be closed is carried in the instruction for closing the plug-in;
    closing the plug-in to be closed according to the process ID corresponding to the plug-in ID of the plug-in to be closed; and
    deleting the plug-in ID and the process ID of the plug-in to be closed from the preset configuration file.

10. The router according to claim 8, wherein the processor is further configured to perform:
    starting the plug-in according to a preset configuration after powering on a router; and
    recording the process ID and the plug-in ID of the plug-in in the preset configuration file.

11. The router according to claim 8, wherein the processor is further configured to perform:
  receiving an instruction for starting the plug-in from the terminal device;
  obtaining the plug-in ID of the plug-in to be started, wherein the plug-in ID of the plug-in to be started is carried in the instruction for starting the plug-in;
  starting the plug-in to be started according to the plug-in ID of the plug-in to be started; and
  recording the plug-in ID and the process ID of the plug-in to be started in the preset configuration file.

12. The router according to claim 11, wherein the operational state of the plug-in comprises at least one from a group consisting of a CPU usage of the plug-in, a memory usage of the plug-in and a rate of writing data to a disk and reading data from the disk.

13. A terminal device for controlling a plug-in, comprising: a processor; a memory configured to store instructions executable by the processor; wherein the processor is configured to:
  send a plug-in state request querying an operational state of a plug-in to a router according to an instruction from a user;
  receive the operational state of a plug-in returned by the router according to the plug-in state request, wherein the operational state of the plug-in returned by the router is obtained by:
    obtaining a plug-in ID carried in the plug-in state request;
    obtaining a process ID corresponding to the plug-in ID from a preset configuration file;
    obtaining the operational state of the plug-in according to the process ID;
  display the operational state of the plug-in to the user;
  send an instruction for closing the plug-in to the router, wherein the router is configured to:
    obtain the plug-in ID of the plug-in to be closed, wherein the plug-in ID of the plug-in to be closed is carried in the instruction for closing the plug-in;
    close the plug-in to be closed according to the process ID corresponding to the plug-in ID of the plug-in to be closed; and
    delete the plug-in ID and the process ID of the plug-in to be closed from the preset configuration file.

14. The terminal device according to claim 13, wherein the processor is configured to send the plug-in state request to the router according to the instruction from the user by:
  obtaining a plug-in ID of a plug-in selected by the user according to the instruction from the user;
  adding the plug-in ID to the plug-in state request; and
  sending the plug-in state request to the router.

15. The terminal device according to claim 13, wherein the processor is configured to display the operational state of the plug-in to the user by:
  generating a user interface according to the operational state of the plug-in; and
  displaying the user interface.

16. The terminal device according to claim 13, wherein the processor is further configured to perform:
  determining whether the operational state of the plug-in reaches a predetermined warning threshold; and
  warning the user if the operational state of the plug-in reaches the predetermined warning threshold.

* * * * *